US008314686B2

(12) United States Patent
Kirtley, Jr.

(10) Patent No.: US 8,314,686 B2
(45) Date of Patent: Nov. 20, 2012

(54) RADIO CONTROLLED SAFETY STOP SYSTEM FOR FORKLIFT TRUCKS WITH RFID

(76) Inventor: James M. Kirtley, Jr., San Jose, CA (US)

( * ) Notice: Subject to any disclaimer, the term of this patent is extended or adjusted under 35 U.S.C. 154(b) by 986 days.

(21) Appl. No.: 12/171,075

(22) Filed: Jul. 10, 2008

(65) Prior Publication Data

US 2009/0303035 A1 Dec. 10, 2009

Related U.S. Application Data

(60) Provisional application No. 61/059,262, filed on Jun. 5, 2008.

(51) Int. Cl.

| | |
|---|---|
| ***G08B 134/14*** | (2006.01) |
| ***G08B 1/08*** | (2006.01) |
| ***G08B 13/08*** | (2006.01) |
| ***H04Q 5/22*** | (2006.01) |
| ***G08G 1/00*** | (2006.01) |
| ***B66F 9/20*** | (2006.01) |
| ***B60T 7/12*** | (2006.01) |

(52) U.S. Cl. ............... 340/10.1; 340/572.1; 340/539.22; 340/901; 49/14; 187/223; 701/96

(58) Field of Classification Search ........................ None
See application file for complete search history.

(56) References Cited

U.S. PATENT DOCUMENTS

| | | | | |
|---|---|---|---|---|
| 4,849,735 | A * | 7/1989 | Kirtley et al. | 340/539.1 |
| 7,298,258 | B1 * | 11/2007 | Hudgens et al. | 340/539.13 |
| 7,999,679 | B2 * | 8/2011 | Van Alstyne | 340/572.1 |
| 2003/0102974 | A1 * | 6/2003 | Allen | 340/686.6 |
| 2006/0007020 | A1 * | 1/2006 | Biermann | 340/945 |
| 2008/0018472 | A1 * | 1/2008 | Dasilva et al. | 340/572.4 |
| 2011/0087417 | A1 * | 4/2011 | Anderson et al. | 701/96 |

* cited by examiner

*Primary Examiner* — Jennifer Mehmood
*Assistant Examiner* — Fekadeselassie Girma
(74) *Attorney, Agent, or Firm* — Patent Law Office of Michael E. Woods; Michael E. Woods

(57) ABSTRACT

A security system including an RFID subsystem for detecting entry of an RFID tag within a monitored area; an RFID token associated with a person accessing the monitored area; and an indicator system for providing an indication when the person enters into the monitored area.

19 Claims, 7 Drawing Sheets

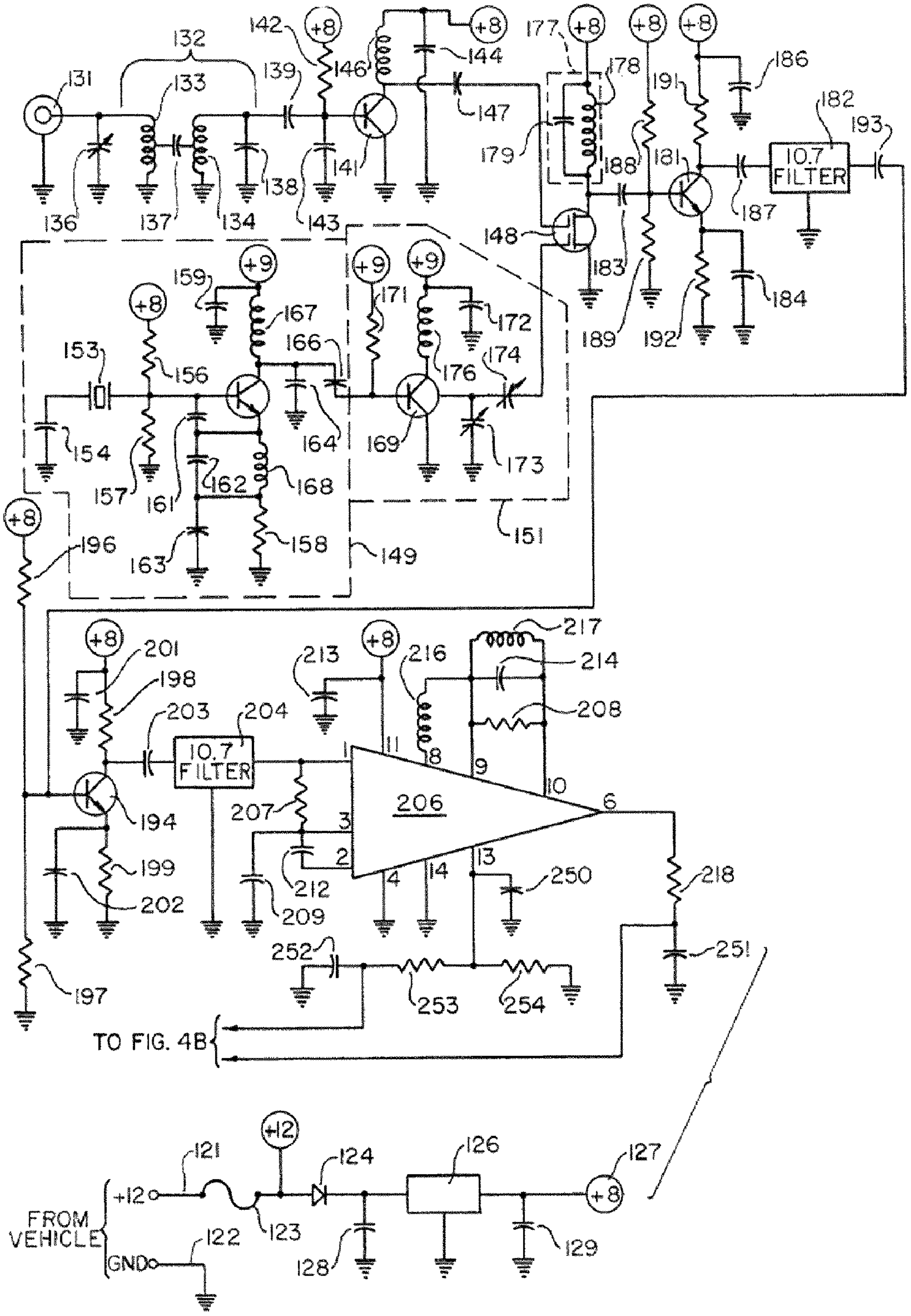
F/G. 4A

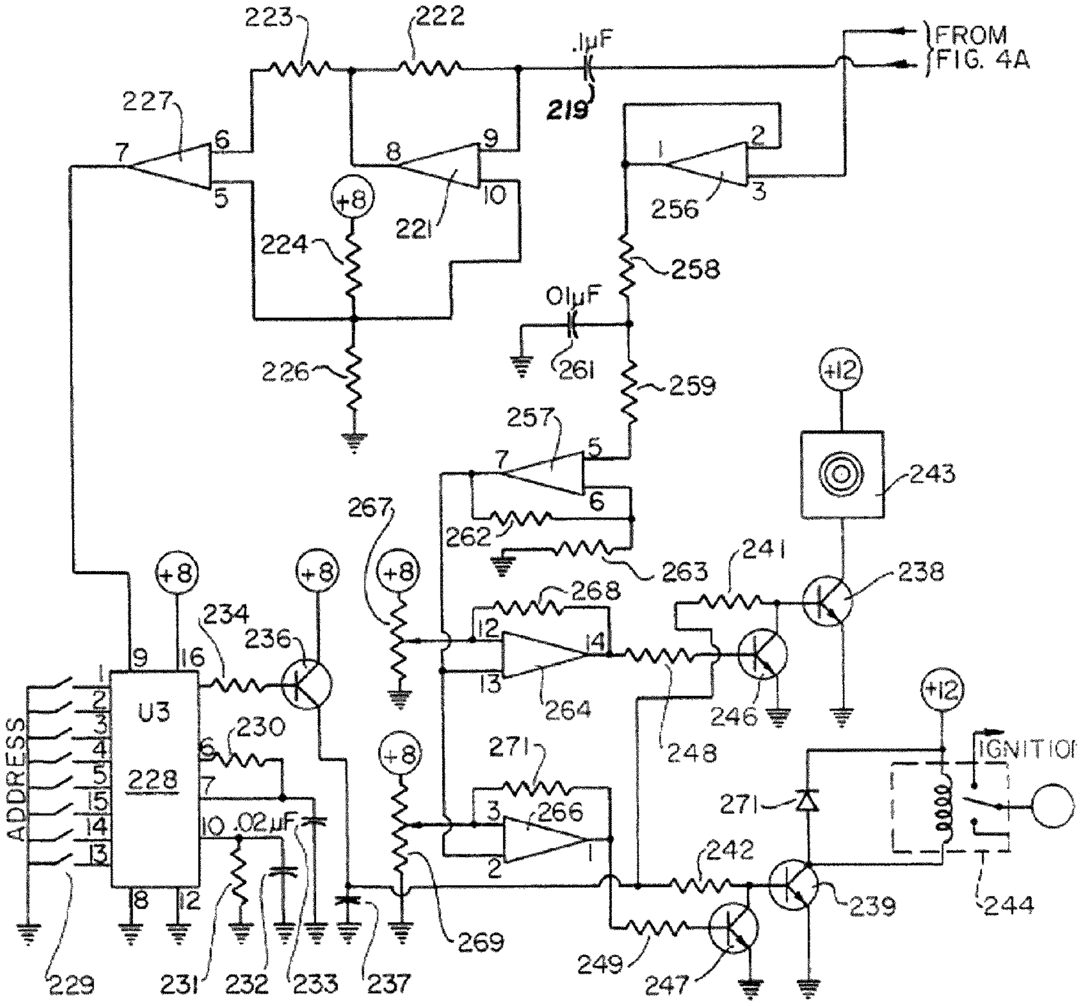
F/G. 4B

EXECUTIVE SUMMARY

Occasionally, there comes along a new idea that – quite frankly - shouldn't be new at all. The problem has long been identified. The human and operational costs have been calculated. The rectifying technology exists. In fact, it would seem that the only thing missing from the ingredient list is will; the will to unite against a particular problem. That is the story of Magic Force, Inc.

The hard facts about forklift accidents are fuzzy for a myriad of reasons but what is known is that some 100 human beings will lose their life this year due to forklift accidents. Today, 1% of factory accidents involve forklift trucks. In fact, pedestrians hit by forklifts make up 45% of all injuries. The Bureau of Workers' Compensation estimates a non-skeletal injury will cost upward of $30,000 while a death will exceed one million dollars.

*It is, however, incalculable what the precise individual andfamilial costs are once a worker is injured.*

*Magic Force's featured product, the Safety Tracker™, is based on patented radio frequency identification (RFID) technology embedded in an OSHA mandated safety equipment. Once a potential accident is detected, forklift drivers are notified. If they fail to heed the warning, forklifts can be disabled to prevent a collision.*

There are 4.5 million warehouse doors, 2.8 million loading dock doors and 30 million man doors in the USA in need of the Safety Tracker ™.

Based on retrofitting 42,000 doors throughout Kirtley Overhead Door, Magic Force projects a $210,000,000 million in revenue. When new door sales, and retrofitted doors sold and maintained by other door companies nationwide are added to the projections, revenue grows to $136,500,000,000.

FIG_6

FEATURED PRODUCT TECHNOLOGY

The Magic Force, Inc., product line includes Dock Levelers, Dock Seals and Shelters, and Truck Restraints. The companies' apex, however, is the patented tracking device.

> *Simply put, when a person enters a specific area, s/he will be tracked If they go into an area that a fork lift could Potentially hit them; the driver is immediately notified.*

Tracking devices, also called 6-degree-of-freedom (6-DOF) devices, are defined as technological tools that are used to observe a specific persons or things movement within a specific location through the use of a transmitter to relay radio signals back to a receiver. There are several types of tracking device technologies.

For many reasons—effectiveness, cost and durability—Magic Force has chosen to employ Radio Frequency ID technology. This rice-grain sized chip uses a scanner/emitter system where the scanners emit low-frequency radio wave signals that can be caught by the tags. The tags, in reply, use their built-in radio emitter to return a small data value that is stored within the tag to the scanner. The radio waves being transmitted by the tag and the scanner works much in the same way as a conventional radio, operating at lower frequencies.

This state-of-the-art device protects against:

- Forklift / pedestrian collisions
- Forklift drive-offs
- Unauthorized access to confined spaces
- MIA visitors and/or employee Since it appears to be impractical to initially stop the forklift truck when it comes within a predetermined distance of danger, the device sounds an initial alarm so that the operator of the forklift may take remedial action to stop. Secondary control is taken out of the hands of the human operator only if the operator does not respond appropriately.

FIG_7

RADIO CONTROLLED SAFETY STOP SYSTEM FOR FORKLIFT TRUCKS WITH RFID

CROSS REFERENCE TO RELATED APPLICATIONS

This application claims benefit of provisional patent application 61/059,262 filed 5 Jun. 2008 entitled RADIO CONTROLLED SAFETY STOP SYSTEM FOR FORKLIFT TRUCKS WITH RFID. This application is related to U.S. Pat. No. 4,849,735 issued 18 Jul. 1989 and titled RADIO CONTROLLED SAFETY STOP SYSTEM FOR FORKLIFT TRUCKS WITH RFID.

BACKGROUND OF THE INVENTION

This invention relates to safety systems, and more particularly to a safety system applicable to a forklift truck to prevent the forklift truck from inadvertently causing injury of personnel on loading docks, warehouses, and other locations where forklift trucks are operated near people.

This invention is an improvement to U.S. Pat. No. 4,849,735 titled "Radio controlled safety stop system for forklift trucks" issued 18 Jul. 1989 and assigned to the present inventor. A search of the prior art related to U.S. Pat. No. 4,849,735 was made, has revealed the existence of U.S. Pat. Nos. as follows: 4,079,802; 2,804,160; 3,683,379; 3,898,652; 4,528,563; 3,892,483; 3,976,151; 4,278,962; 4,136,329; and 3,882,957.

Referring to each of the patents in the order in which they were issued, U.S. Pat. No. 2,804,160 discloses a concept of controlling a trailing vehicle so that it does not rear-end a vehicle in front of it. It accomplishes this purpose by transmitting a radio signal that is reflected from the leading vehicle and is received by the trailing vehicle. The received signal initiates actuation of the brakes or the ignition system of the trailing vehicle so as to prevent a collision.

U.S. Pat. No. 3,683,379 discloses an invention similar to U.S. Pat. No. 2,804,160, but it does so in a different way and with a different circuitry. In this patent, one of the head lamps of the vehicle is used as both the transmitter (filament) and the receiver (reflector) of the reflected wave of radio frequency energy that is reflected from the leading car. The signal so received is then used to actuate an alarm to warn the driver, or to actuate a brake operating solenoid to effect deceleration of the vehicle as required.

U.S. Pat. No. 3,882,957 discloses the concept of a "tilt" switch for use with automobiles so that the ignition and fuel supply are shut off it the vehicle tilts beyond a certain degree. Obviously, this patent has no significant relevance with regard to preventing a forklift truck from running into a closed door.

U.S. Pat. No. 3,892,483 discloses the concept of transmitting a signal both forwardly and backwardly so as to alert motorists in front and behind the vehicle transmitting the signal of their proximity in relation to the vehicle transmitting the signal. Remedial action is initiated by the vehicle, in front or in back, which receives the signal. One of the difficulties encountered with this disclosure is that it presumes that all vehicles in a line of vehicles are similarly equipped, and that there will be interaction between the signals transmitted by the vehicles, i.e., the forwardly transmitted signal of a trailing vehicle will interact with the rearwardly transmitted signal of a leading vehicle. Obviously, such a state of affairs could not be mandated unless required by law.

This application also discloses the concept of a radio signal transmitted rearwardly, the signal varying in intensity (reduced) at increasing distances from the rear of the vehicle. Conceptually, when a trailing vehicle, having an appropriate receiver, enters the radiation area or zone created by the transmitter on the leading vehicle, the receiver on the trailing vehicle initiates a controlling function, i.e., actuates a buzzer, a light or actuates application of the brakes, or interruption of the ignition system.

U.S. Pat. No. 3,898,652 discloses an even more elaborate system than the one immediately preceding in that it discloses the use of side sensors in addition to the use of front and rear sensors. The sensors sense the location of surrounding vehicles, and channel this information into a signal processing unit. The velocity of the vehicle is also sensed, and fed into the processor, which then calculates whether the vehicle can stop in time to avoid running into any other vehicles. The output of the processor may be applied to the vehicle brake and accelerator controls for slowing down a vehicle if the operator does not respond promptly to a warning signal.

U.S. Pat. No. 3,976,151 discloses a system for enabling a golf cart to follow you around the golf course. A small transmitter carried by the golfer transmits a radio frequency signal that is coupled magnetically with a directional antenna on the cart. The cart also carries guidance devices to control the power applied to the wheels so as to make the cart follow the golfer in response to the direction from which the signal emanates.

U.S. Pat. No. 4,079,802 discloses circuitry for controlling the distance between two vehicles traveling at varying velocities. It accomplishes this purpose by sensing the velocity of the trailing vehicle, sensing the velocity of the leading vehicle, determining the difference in their velocities, and then uses this differential to determine what type of control to apply to the trailing vehicle to maintain a predetermined minimum space between the vehicles. It is interesting to note that the circuitry will not only decelerate the trailing vehicle when necessary, but will also accelerate it to maintain the predetermined spacing between the vehicles.

U.S. Pat. No. 4,136,329 discloses a control of the engine of a large truck, such as a large diesel engine. The device monitors certain parameters that must fall within a predetermined range. If the parameters fall outside that range, the control device first warns of the danger, then initiates action to shut down the engine if the driver does not respond. The driver is provided with means for overriding the system when necessary of advisable.

U.S. Pat. No. 4,278,962, discloses an automatic alarm system for detecting obstacles, such as walls or doors, behind a vehicle that is proceeding in reverse. Structurally, a transmitter and a receiver are mounted on a rotating disk contained within a housing mounted on the vehicle. An aperture in the housing permits transmission of a supersonic signal which is reflected from any obstructions and re-enters the hole, or aperture, to be picked up by the receiver. The received signal initiates an alarm, warning the driver that he is approaching an obstacle.

U.S. Pat. No. 4,528,563 discloses a concept that utilizes sound and the frequency of an intermittent sound to alert a driver that he is approaching an obstruction. The sound emanates from different areas, left front, left rear, right front, or right rear, to alert the driver of the direction of the obstruction. This device is said to be particularly adapted to warn the driver when he is backing his vehicle, such as when backing into a garage where his visibility is limited.

We have found that many manufacturing plants and warehouses utilize vast square footage areas to perform their various functions, and that delivery of supplies and the shipping of materials from these plants is frequently by truck or railroad car. To facilitate receiving and shipping goods from these plants, it is the practice to provide shipping and receiving ramps that are elevated above grade level so as to approximate the height of the bed of a truck backed up to the ramp. Alternatively, where railroad cars are used to receive and ship goods at these plants, the ramp is usually spaced from the open door of the railroad car by approximately 3 or 4 feet, and a heavy steel plate or apron is extended between the building ramp and the railroad car to fill the gap and permit the transfer or reception of goods between the railroad car and the plant. In most of these instances, reception of goods and supplies by the plant, or shipment of manufactured goods from the plant or warehouse, is done through large openings in various walls of the plant building that provide an unobstructed opening through which forklift trucks may move. Thus, forklift trucks, under the control of an operator, move back and forth through the opening between the bed of a flat bed truck backed up to the loading ramp, or into the boxcar from which goods are being off-loaded, or into which goods are being loaded for shipment.

It is the custom in industry to utilize large roll-up doors for closing and opening the doorways through which products move. These roll-up doors are frequently articulated steel doors, rolled up by an appropriate motor energized by a worker when the need arises to open or close the door. One of the problems that has plagued industry is that forklift truck operators, for whatever reason, frequently run into these doors with their forklift trucks when the doors are in a closed position. Accordingly, one of the important objects of this invention is the provision of a system that will prevent a forklift operator from driving his forklift truck into a closed door.

The incidence of damage to plant and warehouse doors by the ramming of such doors with a forklift truck has become almost endemic. Several overhead door companies maintain several crews busy repairing such damage. At today's labor and material costs, the repair of such doors can frequently amount to several times the cost of a device such as the one forming the subject matter of this invention for preventing the damage. But the damage to the door cannot be measured only in terms of time and material to effect the repair. Additionally, the doorway in which a damaged door is mounted is out of service for whatever length of time it requires a door repair company to effect the repairs. Sometimes this can be many days, even weeks, while vital parts that are not readily available locally are ordered from the factory and received and installed. Sometimes, the factory sends the wrong part, even though it was properly ordered, thus prolonging the time that the doorway is out of order and unusable by the plant or warehouse. In a case where the door that has been damaged happens to be the only door into or out of the premise for goods being received or shipped, it sometimes becomes necessary to disassemble the entire door assembly and leave it disassembled until either a new door or a repaired door can be installed, with the interval being covered from a security standpoint by the hiring of special security personnel. Again, the cost inherent in the repair of the door far outweighs the cost of a safety device to prevent the damage in the first place.

Besides the risk to the physical premises, other serious concerns include safety of personnel in the area where the forklift trucks are operated as well as concern about authorized access to the area and goods in these areas both from a theft as well as tampering concerns. It is not uncommon for these systems to employ several independent forklift trucks each loading/unloading one or more transportation vehicles. The operators of these forklift trucks are trying to be efficient and drive with significant speed. Other personnel may share this area, and are often on foot while they move in this area as well, checking status of the various operational parameters in the business. The environment is usually loud and visibility may be impaired. This is especially true as a forklift operator as a forklift truck operator must enter into the actual truck or railroad car, sometimes with a full load. As people may be in the area as well, there is a very real risk of injury.

Additionally, these large areas may store significant quantities of goods for distribution to the public. Besides the risk of theft of these goods, maintaining security of the various areas is important to reduce risk of tampering with the goods. The Department of Homeland Security has increased requirements for area security for areas that warehouse volumes of such disposable goods (particularly food and chemicals).

Accordingly, another important object of the invention is the provision of a radio controlled safety stop system for forklift trucks that will alert the driver that he is approaching a danger zone when the forklift truck is a predetermined distance from the door or other controlled area that includes a person, and which automatically interrupts the ignition system of the forklift truck to thereby stop the forklift truck when the forklift truck operator ignores the warning system and continues moving in the direction of danger.

While emphasis has been placed above on the need for a safety device for forklift trucks to prevent the forklift truck from ramming and thereby damaging a closed roll-up overhead door, it is of equal importance that a forklift truck be precluded from driving through an open door under conditions which are unsafe, such as when a truck or a railroad car is not parked adjacent to the platform, thus causing the forklift truck, with its load and operator to drive off the loading platform, with attendant damage to the forklift truck, its cargo and injury to the driver. Accordingly, a still further object of the present invention is the provision of a radio control safety stop system for forklift trucks that will operate to stop a forklift truck from passing through even an open doorway when unsafe conditions prevail.

Forklift trucks that are used in the industrial arena are frequently very heavy vehicles. Some of these forklift trucks weigh as much as 4 and 5 thousand pounds. It is believed that forklift trucks designed for use within a building such as a warehouse or manufacturing plant are geared to travel at perhaps no more than 5 miles per hour. Obviously, there are some exceptions. However, even at 5 miles per hour, a heavily loaded forklift truck can impose a terribly destructive force if it impacts an obstacle, such as a closed door. Since it appears to be impractical to initially stop the forklift truck when it comes within a predetermined distance of the doorway, it is one of the objects of this invention to initially sound an alarm so that the operator of the forklift truck may himself take remedial action to stop the forklift truck.

It is another object of the invention to only secondarily take control of the forklift truck out of the hands of the human operator and to interrupt the ignition system of the forklift truck when the forklift truck is within a predetermined proximity to the door.

The invention possesses other objects and features of advantage, some of which, with the foregoing will be apparent from the following description and the drawings. It is to be understood however that the invention is not limited to the embodiment illustrated and described since it may be embodied in various forms within the scope of the appended claims.

BRIEF SUMMARY OF THE INVENTION

One purpose of this safety equipment is to prevent forklifts from causing injury and deaths of personnel on loading docks and in warehouses. It will also be used on the outside of the perimeter, wherever people and forklifts would come into contact. In the event that they come too close it will cause the forklift to shut down. The present invention includes apparatus, system, and method. The system includes an RFID subsystem for detecting entry of an RFID tag within a monitored area; an RFID token associated with a person accessing the monitored area; and an indicator system for providing an indication when the person enters into the monitored area.

There will be RFID tags installed in hard hats and people will be required to wear hard hats and vests and check in before going onto the property of the company. This will identify each person that is on the sight. In case of an emergency the identity of each person will be transferred to a computer as they checked in and the company will know who is on the premises.

In terms of broad inclusion, the radio control safety stop system for forklift trucks forming the subject matter of this invention comprises a transmitter mounted above a doorway in such a way that a radio signal is continuously transmitted by the transmitter in a pattern such that the signal strength of the radio signal at a predetermined far distance from the door is detectably weaker than the radio signal that is detected at a predetermined near distance from the door. Mounted on the forklift truck and provided with an appropriate antenna to detect the signals being transmitted, is a radio receiver which detects the radio signal when the forklift truck moves into the far distance zone included by the relatively weak radio signal, and which then functions to actuate an alarm to warn the driver that the is approaching a danger zone. If the driver disregards the alarm and proceeds closer to the point of danger, say to the predetermined near distance limit at which the radio signal isomer intense, the radio receiver on the forklift truck detects this second level of radio signal strength and responds by actuating means which disables the ignition system of the forklift truck, thus causing the forklift truck to stop within a very short distance and certainly before it reaches the closed door, or the open doorway. We have found that for most installations, a far distance limit set at fifteen feet provides sufficient time for the operator, if he is alert and aware of the danger, to take remedial action to stop the forklift truck. Additionally, we have found that if the forklift truck proceeds to within about 4 feet from the closed door or open doorway, interrupting the electrical ignition system at this point gives adequate opportunity to stop the forklift truck before it rams the closed door or passes through the open doorway. Since it frequently is necessary for the forklift truck to intentionally pass through an open doorway, means are providing for disabling the transmitter when safe conditions prevail at the doorway. In another aspect of the invention, it may be necessary for different reasons to maintain an overhead door open during regular business hours even if no truck or railroad car is present adjacent the loading platform. Under these circumstances, means are provided to activate the radio control safety stop system for forklift trucks so that a forklift truck driver, being preoccupied with other matters, will not drive through an open doorway and off of the elevated loading ramp.

BRIEF DESCRIPTION OF THE DRAWINGS

FIG. 4(A) is a schematic view of a portion of the receiver circuitry;

FIG. 4(B) is a continuation from 4(A) of the receiver circuitry;

FIG. 6 is an executive summary of an embodiment of the present invention;

FIG. 7 is an overview of featured product technology; and

DETAILED DESCRIPTION OF THE INVENTION

The present invention relates to systems, and methods that reduces a potential of collision between a vehicle and a pedestrian by providing the pedestrian with an RFID tag that is detectable, when in a desired safety range, by an operator of the vehicle (or the vehicle itself when an automated vehicle/unattended vehicle) to first issue a warning within a first range and then to disable the vehicle when within a second closer range. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

One purpose of this safety equipment is to prevent forklifts from causing injury and deaths of personnel on loading docks and in warehouses. It will also be used on the outside of the perimeter, wherever people and forklifts would come into contact. In the event that they come too close it will cause the forklift to shut down.

There will be RFID tags installed in hard hats and people will be required to wear hard hats and vests and check in before going onto the property of the company. This will identify each person that is on the sight. In case of an emergency the identity of each person will be transferred to a computer as they checked in and the company will know who is on the premises.

Figure 1:
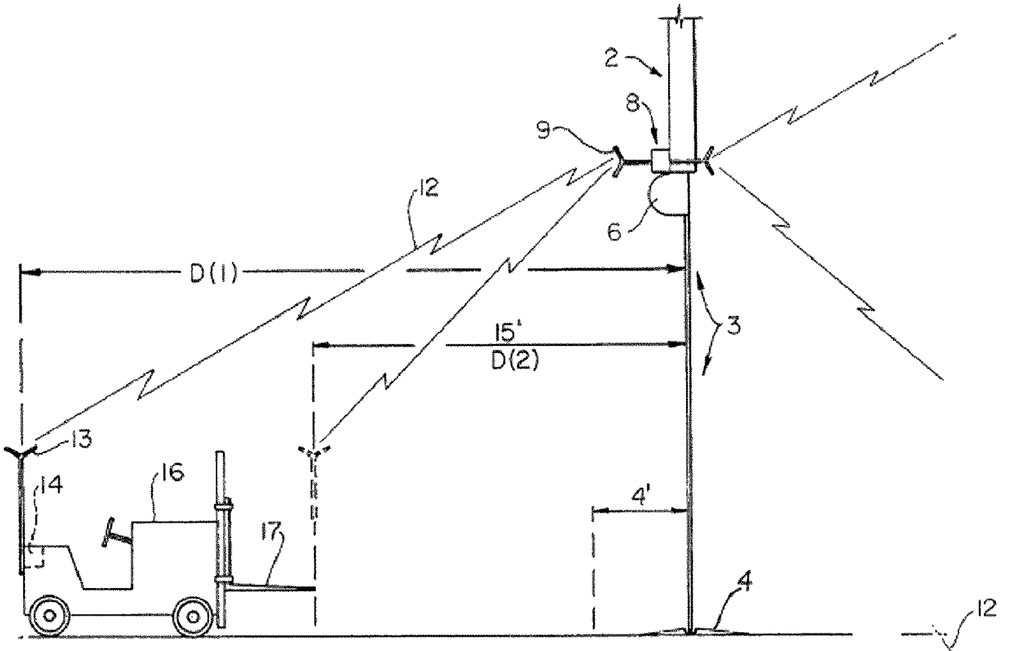
FIG. 1 is a pictorial view illustrating the environment and relationship of the invention in its position of use.

Referring to FIG. 1, it will there be seen that the radio controlled safety stop system for forklift trucks forming the subject matter of this invention is utilized in an area, such as a warehouse or manufacturing plant in which a wall 2 is provided with a roll-up type door assembly designated generally by the numeral 3 and which includes a floor plate 4 and a roll-up mechanism 6 adapted to be activated in the conventional manner either manually by a chain working over a sprocket to effect roll-up of the door 7, or through use of an electric motor drive connected to the sprocket or to an appropriate gear drive whereby the door 7 is rolled upwardly into an open position, or rolled downwardly into a closed position by selective energization of the electric motor. These controls are conventional and are therefore not illustrated in the drawing in the interest of brevity in this description. Suffice to say that the door 7 is provided with means for de-energizing the electric motor when the door has reached either its extreme open position or its extreme closed position. Such means for de-energizing the electric motor may be a switch of the type that is actuated by proximity to a magnetic which is supported on the door to bring it into proximity with the switch, or it may constitute a lever that is abutted by an appropriate projection on the door, or it may be any of a number of other devices that may be used to interrupt power to the electric motor.

Mounted on the wall 2 above the door, preferably medianly placed thereabove between the two side edges of the doorway, is a transmitter designated generally by the numeral 8, having a transmitting antenna 9 projecting therefrom and adapted to transmit a very short range 360 degree radio signal 12 that forms a radio signal "envelope" on the interior and exterior of the building wall 2. The radio signal "envelope" must therefore be penetrated in order to reach the door 7. The radio signal 12 is such that a pre-determined far distance D(1) from the door 7, the signal strength is relatively weak (level A) in comparison with the signal strength (level B) at pre-determined near distance D(2) from the door. Stated another way, as the "envelope" formed by the radio signal is penetrated in a direction from the far distance limit at which it is first detected toward the door meant to be protected, the signal strength increases from a weak level A signal to a significantly stronger level B signal. The difference in strength of the radio signal between level A and level B is sufficient to be detected, as will hereinafter be explained.

As illustrated in FIG. 1, the installation of the transmitter and the strength of the radio signal 12 is "tailored" or "customized to be detected and received by an antenna 13 appropriately connected to a receiver 14 mounted on the forklift truck 16. Preferably, the radio signal 12 is adapted to be first detected by the receiving antenna 13 at far distance D(1) when the tips of the tines or forks 17 of the fork lift truck are approximately 15 feet away from the door. Obviously, because forklift trucks differ in their size, elevation and speed of travel, and because antennas must be mounted on such forklift trucks in different locations, these dimensions may be varied to "customize" the system to a particular customer. Since, with the present system, it is desirable that the ends of the forks of the forklift truck come no closer than about 4 feet from the door, it will be seen from FIG. 1 that the antenna 13 will have been transposed to the near distance position D(2) illustrated in broken lines when the ends of the tines or forks 17 have reached the position where the forklift truck will be stopped to prevent it from damaging the door.

In the preferred embodiment, the door is equipped with an appropriate magnet which comes into close proximity to a reed type switch (ON or OFF) responsive to the magnetic field of the magnet when the door is in open position. When the door is in open position, the transmitter 8 is turned OFF by closing of the reed switch by the magnetic field of the magnet. When the door is closed, the magnet is far removed from the reed switch and the switch is in its OFF position, and the transmitter is turned ON. Since this type of arrangement is conventional, and may vary with each installation because of local needs, it is omitted from the drawings in the interest of clarity. Obviously, the reverse situation may be arranged so that the transmitter is ON when the door is open.

The receiver 14 is energized whenever the ignition switch (not shown) of the forklift truck is ON to enable operation of the forklift truck. Once energized, the receiver "listens" for the coded signal from the transmitter 8, which is coded in a manner to be hereinafter explained. When the receiver "hears" the correct coded radio signal, the alarm circuitry and the ignition "kill" circuitry are "enabled" to respond when the forklift truck reaches the far distance D(1) position and the near distance D(2) position, respectively. Thus, when the forklift truck is within about fifteen feet of the door, the alarm sounds, warning the driver to take remedial action. If no remedial action is taken, and the forklift truck progresses to about four feet from the door, the ignition of the forklift truck is interrupted and the forklift truck comes to a stop before it can impact with and damage the door. Since leaving the forklift truck at the position at which the ignition was interrupted could contribute to an unsafe situation, the system is provided with a momentary over-ride switch that can be manipulated by the operator to move the forklift truck out of the restricted area.

Figure 2:
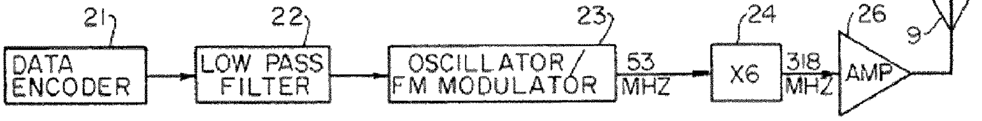
FIG. 2 is a block diagram of the transmitter assembly.

Referring to the block diagram of FIG. 2, it will be seen that the properly encoded signal is passed from the data encoder 21 through a low-pass filter 22 which conditions the signal and passes it on to the oscillator/FM modulator 23 which outputs a 53 MHz signal that is multiplied by six at 24 to direct a 318 MHz signal into the amplifier 26, and thence into the transmitter antenna 9. It will of course be understood that the transmitter is powered via a power cord plugged into a standard 120 VAC power outlet commonly found in most buildings. These elements, being conventional, are shown schematically in the drawing in the interest of clarity.

Figure 3:
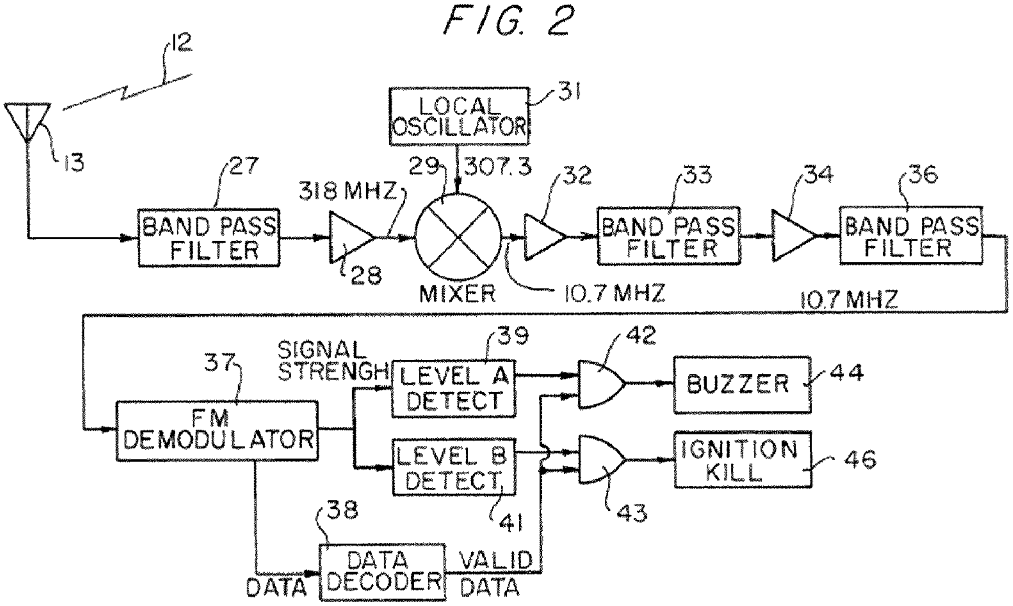
FIG. 3 is a block diagram of the receiver assembly.

Referring to the receiver circuit illustrated in block diagram form in FIG. 3, the 318 MHz encoded signal is received by the antenna 13 on the forklift truck, passes through bandpass filter 27 and tuned amplifier 28 and into the mixer 29. Local oscillator 31 feeds a 307.3 MHz signal into the mixer 29, and the differential frequency of 10.7 MHz is fed through amplifier 32, bandpass filter 33, amplifier 34, bandpass filter 36 to FM demodulator 37. From the demodulator 37, the signal is passed to a data decoder 38 on the one hand, and to a pair of signal level detector devices 39 and 41 on the other hand. Valid data is channeled to a pair of AND gates 42 and 43 from the data decoder, and level A signal strength detector 39 outputs to AND gate 42, while level B signal strength detector 41 outputs to AND gate 43, whereupon buzzer 44 is triggered to sound when the forklift truck has reached the far distance D(1) signal penetration position, and the ignition "kill" relay 46 is activated when the forklift truck has reached the near distance signal penetration limit illustrated in FIG. 1 of the drawing as D(2).

Transmitter

Figure 5:
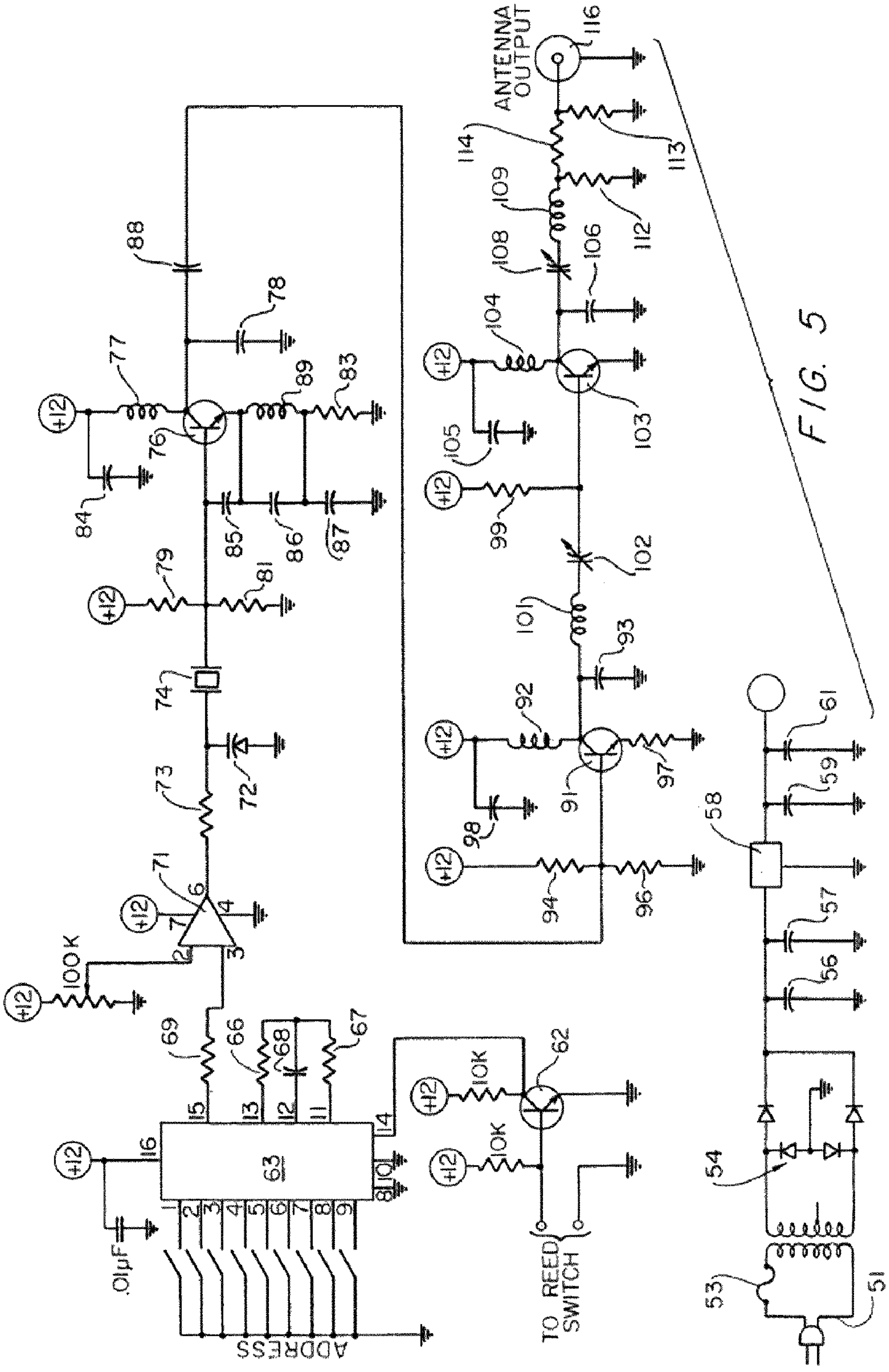
FIG. 5 is a schematic view of the transmitter circuit.

Referring with greater specificity to the transmitter circuitry illustrated schematically in FIG. 5, the transmitter is powered by power cord 51 adapted to plug into a conventional 120 VAC power outlet. As illustrated, the primary winding of center-tap transformer 52 is protected by a 0.5 amp fuse 53. The secondary winding of the transformer is connected as shown to a full wave rectifier bridge 54 of the type manufactured and sold by Motorola under the trade designation 1N4001. Capacitors 56 and 57 filter the input voltage to the regulator 48, which is conveniently of the LM7812 type manufactured by National Semiconductor. It should be noted that the LM78XX series of voltage regulators from National Semiconductor are functionally equivalent to the MC7800 series voltage regulators manufactured and sold by Motorola. As shown, the output from the voltage regulator 58 is further filtered by capacitors 59 and 61.

Mounted on or in close proximity to the transmitter 8 is a reed-type switch (not shown) which is normally open when the door 7 is closed, but which responds to an appropriate magnet (not shown) mounted on the door when the magnet is brought into close proximity to the reed switch by the act of opening the door 7 to provide a passageway through the wall 2. The effect of bringing the magnet into close proximity with the reed switch is to cause the reed switch to close. In the embodiment illustrated, as long as the reed switch is closed, as when the warehouse door is open, the NPN-type silicon RF high frequency transistor 62 is prevented from turning "on", since in this condition of the situation, the door being open, it does not require protection from damage by forklift trucks. However, when the door closes, and the magnet on the door is removed from proximity with the reed switch, then the transistor 62 turns "on", and terminal pin 14 on the encoder designated generally by the numeral 63 goes low, thus enabling the encoder to transmit a data signal, the content of which is controlled by the selective actuation of the nine input switches designated generally by the numeral 64. We have found an encoder of the type manufactured by Motorola and designated MC145026 to be satisfactory for our purpose, since it will encode nine bits of information and serially transmit this information upon receipt of a transmit enable, i.e., active low, signal. The nine inputs may be encoded with trinary data (0, 1, and open), thus allowing 3.sup.9 (19,683) different codes. It will thus be apparent that with this many code options, the protective system of the invention can be "tailored" or "customized" for various customers to meet their specific operational needs, e.g., the transmitted radio signal is encoded with identifiable data, and the radio receiver's data decoder decodes a stream of data received from the transmitter whereby different codes may be assigned to different forklift trucks whereby some forklift trucks are enabled to enter the restricted area while other forklift trucks are prevented from entering the restricted area.

Resistors 66 and 67, and capacitor 68 set the time base for the encoder 63. For the circuit illustrated, the data rate is approximately 420 baud, or bits per second. The output from the encoder is channeled through resistor 69 to operational amplifier 71 which functions as a buffer for the data, and additionally controls the voltage on voltage-variable capacitance diode 72, which receives the voltage through resistor 73. The voltage-variable capacitance diode 72 is of the type designated MV2201 and manufactured by Motorola. The capacitance of the diode varies with the voltage across it, from 5.4 pF to 8.1 pF, with a nominal value of 6.8 pF.

This variance of capacitance in the diode 72 causes the resonant frequency of the crystal 74 to shift slightly, allowing the data stream to frequency-modulate the oscillator 76. The crystal forms the basis for the oscillator, which is tuned to the second harmonic (106 MHz) with inductance coil 77 and capacitor 78. The values of resistors 79, 81, and 83 are tabulated below, as are the values of capacitors 84, 85, 86, 87 and 88, and the value of the inductance coil 89. From the oscillator 76, the signal is channeled to the NPN-type silicon high-frequency transistor 91 which functions as a radio frequency amplifier to multiply the signal by three to 318 MHz, cooperating in this respect with inductance coil 92 and capacitor 93. The values of resistors 94, 96, and 97, and capacitor 98 are tabulated below. From the amplifier 91, the signal then passes through a bandpass filter formed by inductance coil 101 and variable capacitor 102 before the signal reaches the final amplifier 103 which is of the same type as amplifier 91 and is tuned with inductance coil 104 and capacitor 106. From the amplifier 103, the signal is channeled through a second bandpass filter formed by variable capacitor 108 and inductance coil 109, from whence it passes through a resistive matching network made up of resistors 112, 113 and 114 to the output jack 116 of the antenna 9.

Receiver

Referring with greater specificity to the receiver schematic illustrated in FIGS. 4(A) and 4(B), power to the receiver is taken from the ignition of the forklift truck through leads 121 and 122, the latter being a ground lead. When the ignition is turned on to render the forklift truck operative, the power to the receiver is also turned on, rendering the receiver operative. As indicated, power enters the circuit through 0.5 amp fuse 124, diode 123, through the voltage regulator 126 to the output terminal 127. The diode 124 is a general purpose diode bearing the designation 1N4003 and manufactured by Motorola. The voltage regulator is manufactured by National Semiconductor, and carries the designation LM7808. Capacitors 128 and 129 filter the voltage before and after the regulator 126.

The encoded signal transmitted by antenna 9 of the transmitter enters the receiver through antenna 13 of the receiver and through antenna jack 131. The signal passes through a bandpass filter designated generally by the numeral 132 and formed specifically from inductance coils 133 and 134, and variable capacitor 136 and fixed capacitors 137 and 138, thence through capacitor 139 to pre-amplifier 141, which functions as a tuned amplifier in cooperation with resistor 142, capacitors 143 and 144 and inductance coil 146 to deliver the signal through capacitor 147 to the mixer 148. Pre-amplifier 141 is of the MRF 904 type manufactured by Motorola, while the mixer 148 is an RCA MOSFET designated 3N211.

The mixer 148 also receives a signal from the local oscillator designated generally by the numeral 149, and through the tuned buffer/amplifier designated generally by the numeral 151. The local oscillator 149 includes transistor amplifier 152 and related circuitry, including crystal 153 having a resonant frequency of 51.2167 MHz, variable capacitor 154, resistors 156 157 and 158, and fixed capacitors 159, 161, 162, 163, 164 and 166, and inductance coils 167 and 168. Transistor amplifier 152 is designated 2N2222 and is manufactured by Motorola. In this local oscillator circuit, inductance coil 167 resonates with capacitor 164 to amplify the third harmonic of the crystal 153 to a frequency of 153.65 MHz.

The tuned buffer/amplifier circuit 151 functions to double the local oscillator frequency of 153.65 MHz to 307.3 MHz, and feeds this doubled frequency to the mixer 148. The tuned buffer/amplifier circuit 151 includes a high frequency transistor 169 designated 2N5179 manufactured by Motorola, resistor 171, fixed capacitor 172, variable capacitors 173 and 174, and inductance coil 176.

Associated with the mixer 148 is a transformer 177 composed of inductive coil 178 and capacitor 179. The transformer 177 resonates at 10.7 MHz, which is the differential between the frequency of the signal supplied to the mixer by the pre-amplifier 141 and the local oscillator 149. The transformer 177 picks up the intermediate frequency and feeds it to transistor amplifier 181 for amplification into the ceramic filter 182. The transistor amplifier 181 works in conjunction with fixed capacitors 183, 184, 186, and 187, and resistors 188, 189, 191, and 192 as illustrated. The transistor amplifier 181 is of the 2N2222 type similar to the transistor 152 utilized in the local oscillator. From the filter 182, the signal passes through capacitor 193 to transistor amplifier 194, also of the 2N2222-type similar to transistor amplifier 181. This transistor amplifier works in conjunction with resistors 196, 197, 198 and 199, and fixed capacitors 201, 202 and 203 as shown. After passing through capacitor 203, the output signal from the transistor amplifier 194 is again filtered by ceramic filter 204 and passes to the demodulator chip 206. The demodulator chip 206 is manufactured by RCA and carries the trade designation CA3089, and constitutes a monolithic integrated circuit which uses quadrature detection to demodulate the IF signal into audio. As indicated in the drawing, the demodulator chip 206 has two outputs at pins 6 and 13, a voltage level which varies proportionally with the signal strength, at pin 13, and the demodulated audio output at pin 6. Working in conjunction with the demodulator chip 206 are resistors 207 and 208, fixed capacitors 209, 212, 213, and 214, fixed inductance coil 216 and variable inductance coil 217. The values for these components are tabulated below.

The demodulated audio output from pin 6 is fed through resistor 218, capacitor 219 into operational amplifier 221, which is one of four operational amplifiers on the integrated circuit, which converts the demodulated audio output into a datastream. Operational amplifier 221 cooperates with resistors 222, 223, 224 and 226 to feed the signal into the second operational amplifier 227 which is contained on the same integrated circuit as operational amplifier 221 and which functions to give the data stream sharper edges and re-inverts the signal to feed it to the data decoder device designated generally by the numeral 228. As illustrated, a part of the assembly of the decoder device 228 includes a switch designated generally by the numeral 229 and including a plurality of switches which are pre-set to decode the data stream, the particular decoder chip designated treating all nine bits of data received as address data. We have found that for our purpose, a decoder device manufactured by Motorola and sold under the trade designation MC145028 performs satisfactorily in the circuit. Resistors 230 and 231, and capacitors 232 and 233 set the data rate for the decoder device 228 to approximately 420 baud. Thus, if the data stream input into the decoder matches the address defined by the switch assembly 229, then the decoder device outputs a "high" voltage at pin 11. This voltage is applied through resistor 234 to the transistor amplifier 236, which becomes conductive and charges capacitor 237, and tries to turn on transistor amplifiers 238 and 239, connected in parallel, the signal to these transistor amplifiers passing through resistors 241 and 242, respectively. It will of course be apparent from the circuit, that the transistor amplifier 238 when in a conductive condition functions to sound the buzzer 243. Additionally, when the transistor amplifier 239 is in an on or conductive condition, it energizes the "kill" relay 244 to interrupt the ignition circuit of the forklift truck and cause it to stop.

Whether or not transistor amplifiers 238 and 239 turn on or become conductive is controlled by transistor amplifiers 246 and 247, respectively, working in conjunction with resistors 248 and 249. It should be noted that transistor amplifiers 238239, 246 and 247 are all of the 2N2222-type similar to transistor amplifiers 236, 194, 181 and 152.

As indicated above, the demodulator device 206 has two outputs, one of these being from pin 13 which outputs a voltage level which varies proportionally with the signal strength. The signal output from pin 13 of demodulator 206 passes through an RC low-pass filter composed of capacitors 250 and 252, and resistors 253 and 254, before being input to one of two operational amplifiers 256 and 267 on the same integrated circuit, the operation amplifier 256 functioning as a unity gain buffer. Resistors 258 and 259, and capacitor 261 function as a second RC low-pass filter before the voltage level is amplified by operational amplifier 257. Operational amplifier 257 cooperates with resistors 262 and 263 to feed the signal in parallel to operational amplifiers 264 and 266 connected as shown, including 100K ohms potentiometer 267 cooperatively associated with resistor 268 and operational amplifier 264; and 100K ohms potentiometer 269, cooperatively related with resistor 271 associated with operational amplifier 266. Operational amplifier 264 functions as a comparator to compare the signal strength against the reference voltage set by potentiometer 267. When the signal strength, or voltage, is greater than the reference voltage, the output will go low to turn off transistor amplifier 246, enabling transistor amplifier 238 to turn on the buzzer 243, provided of course, that the decoder device 228 has received the correct data. Operational amplifier 266, on the other hand, compares the signal strength against the reference voltage set by potentiometer 269. Again, when the signal strength or voltage, is greater than the reference voltage, the output of operational amplifier 266 will go low, to turn off transistor amplifier 247, enabling transistor amplifier 239 to turn on the relay to cut the ignition if the signal strength is greater than the reference voltage, and again, if the correct data is received by the decoder device 228.

In the interest of clarity in the drawings, the values of the components utilized in the circuits have been omitted from the drawings, the components being referred to by reference numbers. There follows in tabulated form a listing of the components, indicated by reference number and indicating the nomenclature and, where appropriate, the preferred value for each:

Transmitter

Reference No. Nomenclature Parameter 53 Fuse 0.5 Amp. 52 Transformer 12.5 V CT. 54 Diode Rectifier Bridge 1N4003 56 Capacitor 470 uF 57 Capacitor 0.1 uF 58 Voltage Regulator LM7812 59 Capacitor 470 uF 61 Capacitor 0.1 uF 62 Transistor Amplifier 2N2222 63 Data Encoder MC145026 64 Switch 66 Resistor 10K 67 Resistor 20K 68 Capacitor 0.0051 uF 69 Resistor 10K 71 Operational Amplifier 72 Diode MV2201 73 Resistor 20K 74 Crystal 76 Transistor Amplifier 2N2222 77 Coil 5.5T 78 Capacitor 8 pF 79 Resistor 9.1K 81 Resistor 620 ohms 83 Resistor 33 ohms 84 Capacitor 0.001 uF 85 Capacitor 68 pF 86 Capacitor 91 pF 87 Capacitor 0.001 uF 88 Capacitor 6 pF 89 Coil 0.22 uH 91 Amplifier MRF904 92 Coil 2.5T 93 Capacitor 2 pF 94 Resistor 9.1 K 96 Resistor 620 ohms 97 Resistor 33 ohms 98 Capacitor 0.001 uF 99 Resistor 100 K 101 Coil 1.5T @0.15" Dia. 102 Variable Capacitor 2-10 pF 103 Amplifier MRF904 104 Coil 2.5T 105 Capacitor 0.01 uF 106 Capacitor 1.0 pF 108 Variable Capacitor 2-10 pF 109 Coil 1.5T @0.15" Dia. 112 Resistor 100 ohms 113 Resistor 100 ohms 114 Resistor 75 ohms 116 Antenna jack.

Receiver

Reference Nomenclature Parameter 121 Input Lead +12 V 122 Ground Lead 123 Fuse 0.5 Amp 124 Diode Rectifier 1N4003 126 Voltage Regulator LM7808 127 Terminal +8 V 128 Capacitor 100 uF 129 Capacitor 100 uF 131 Antenna jack 132 Bandpass Filter 133 Coil 2.5 T 134 Coil 2.5 T 136 Variable Capacitor 2-10 pF 137 Capacitor 5 pF 138 Capacitor 1.5 pF 139 Capacitor 5 pF 141 Amplifier MRF904 142 Resistor 68K 143 Capacitor 1 pF 144 Capacitor 0.001 uF 146 Coil 2.5 T 147 Capacitor 3 pF 148 3N211 MOSFET Amplifier To 200 MHz 149 Local Oscillator 153.65 MHz 151 Tuned Buffer/Amplifier 307.3 MHz 152 Transistor Amplifier 2N2222 153 Crystal 154 Variable Capacitor 10-40 pF 156 Resistor 9.6 K 157 Resistor 1 K 158 Resistor 33 ohms 159 Capacitor 0.01 uF 161 Capacitor 68 pF 162 Capacitor 91 pF 163 Capacitor 0.01 uF 164 Capacitor 3 pF 166 Capacitor 20 pF 167 Coil 2.5 T 168 Coil 0.22 uH 169 Tuned Buffer/Amplifier 2N5179 171 Resistor 82 K 172 Capacitor 0.001 uF 173 Variable Capacitor 2-10 pF 174 Variable Capacitor 2-10 pF 176 Coil 1.5 T 177 Transformer 10.7 MHz 178 Coil 179 Capacitor 181 Transistor Amplifier 2N2222 182 Ceramic Filter 10.7 MHz 183 Capacitor 0.01 uF 184 Capacitor 0.01 uF 186 Capacitor 0.01 uF 187 Capacitor 0.01 uF 188 Resistor 9.1 K 189 Resistor 910 ohms 191 Resistor 330 ohms 192 Resistor 10 ohms 193 Capacitor 0.01 uF 194 Transistor Amplifier 2N2222 196 Resistor 3.3 K 197 Resistor 330 ohms 198 Resistor 330 ohms 199 Resistor 10 ohms 202 Capacitor 0.01 uF 203 Capacitor 0.01 uF 204 Ceramic Filter 10.7 MHz 206 Demodulator Chip CA3089 207 Resistor 330 ohms 208 Resistor 8.2 K 209 Capacitor 0.01 uF 212 Capacitor 0.01 uF 213 Capacitor 0.01 uF 214 Capacitor 100 pF 216 Coil 0.22 uH 217 Variable Inductor Coil 218 Resistor 4.7 K 219 Capacitor 0.1 uF 221 Operational Amplifier 222 Resistor 100 K 223

Resistor 4.7 K 224 Resistor 4.7 K 226 Resistor 4.7 K 227 Operational Amplifier 228 Decoder MC145028 229 Switch 230 Resistor 9.1 K 231 Resistor 200 K 232 Capacitor 0.02 uF 233 Capacitor 0.02 uF 234 Resistor 1.0 K 236 Transistor Amplifier 2N2222 237 Capacitor 100 uF 238 Transistor Amplifier 2N2222 239 Transistor Amplifier 2N2222 241 Resistor 10 K 242 Resistor 10 K 243 Alarm Buzzer 244 Relay 246 Transistor Amplifier 2N2222 247 Transistor Amplifier 2N2222 248 Resistor 10 K 249 Resistor 10 K 250 Capacitor 0.001 uF 251 Capacitor 0.001 uF 252 Capacitor 0.01 uF 253 Resistor 33 K 254 Resistor 33 K 256 Operational Amplifier 257 Operational Amplifier 258 Resistor 47 K 259 Resistor 47 K 261 Capacitor 0.01 uF 262 Resistor 220 K 263 Resistor 220 K 264 Operational Amplifier 266 Operational Amplifier 267 Potentiometer 100 K 268 Resistor 100 K 269 Potentiometer 100 K 271 Diode 1N914.

Figure 8:
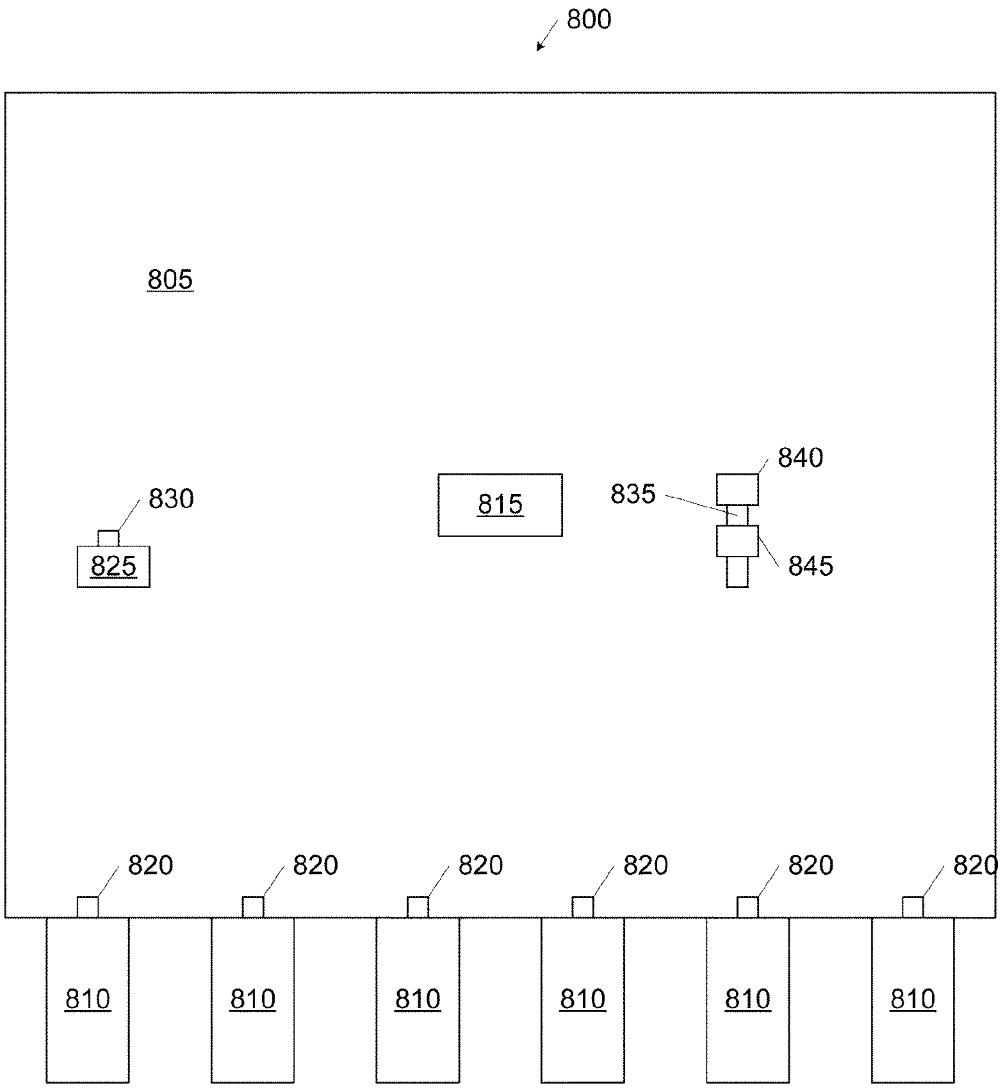
FIG. 8 is a block schematic diagram of an alternate preferred embodiment of the present invention.

FIG. 8 is a block schematic diagram of an alternate preferred embodiment of the present invention for a security system 800. System 800 includes a first type of monitored area 805 (e.g., a warehouse or other storage facility where forklift trucks operate) and a plurality of second type of monitored areas 810 (e.g., the cargo areas of transportation systems like trucks, railcars, and shipping containers as well as other auxiliary storage rooms). System 800 includes an RFID subsystem 815 for monitoring monitored areas 805 and 810. One or more RFID transceiver/detector systems are used sufficient to monitor all the areas. Additionally in the preferred embodiment, RFID subsystem includes a query system for locating specific RFID tokens within the monitored areas as well as a recording system for creating a history of time-stamped RFID token entries and RFID token exits and other transactions within the monitored areas.

Distributed throughout the preferred embodiment of system 800 are indicators 820. For ease of understanding, these are shown associated with each of a plurality of passageways from first monitored area 805 to each of second monitored areas 810. These indicators 820 may be visual signals (e.g., a type of traffic light having green (safe), yellow (caution), and red (stop) lights), audible (e.g., horns/sirens/whistles), combinations, or other indication. Indicators 820 may also be distributed within first monitored area 805 for providing an indication within monitored subzones of first area 805.

One or more forklift trucks 825 or other vehicle operate with the monitored areas. Other vehicles that could pose a security/safety risk may also operate within the monitored areas and would all be included within the class of vehicles identified by truck 825. In some implementations, each truck 825 is provided with a safety system 830. In some instances, safety system 830 is an indicator similar to indicator 820 to provide the operator with an indication of the status of the various areas/sub-zones they approach or are currently in. In other instances, in addition to or in lieu of, safety system 830 includes an interlock system for disabling/preventing truck 825 from entering within certain monitored areas/subzones under various conditions.

One or more people 835 may enter into the various areas. To reduce a risk of injury to these people 835, an operator of system 800 provides each person 835 with an RFID token. In the preferred embodiment, RFID token includes a hardhat with a first unique RFID tag 840 and a safety vest with a second unique RFID tag 845. The operator of system 800 associates tag 840 and tag 845 with a specific person 835. RFID subsystem 815 detects the tags, ensures that they match and form a token, and determines which monitored area person 835 occupies at any given time. RFID subsystem activates one or more of indicators 820 and 830 as appropriate based upon the location of person 835.

The following description of the operation of system 800 describes one forklift truck 825 and one person 835 operating within one or more monitored areas to simplify the discussion. It is understood that in other implementations there may be many forklift trucks, persons, and monitored areas. In operation, an operator of truck 825 typically performs loading tasks (e.g., loading and unloading) with respect to one or more monitored areas or sub-zones thereof. The operator drives quickly and the environment is often loud. When a forklift truck is loaded, visibility can be greatly impaired, particularly in the forward direction. Additionally, some of the monitored areas (particularly may be true for the second monitored areas 810) lighting may be poor or absent. It is common for person 825 to be required to be within some of the various monitored areas at the same time as the forklift trucks. For example, when second monitored area is a cargo area of a transportation truck, person 835 may be the truck driver. Person 835 may enter into second monitored area to check on the loading/unloading status or otherwise check on the status of the contents. When person 835 enters into a particular one of second monitored areas 810, indicator 820 associated with that particular area will indicate caution or STOP/DO NOT ENTER. Forklift truck 825 operator will not enter into the particular area until the indicator is cleared by the person leaving the monitored area. In some cases, indicators 820 may not provide a high enough level of safety/security. This may be partially true because the visibility of a visual-only indicator may be impaired at some times due to a load on a forklift truck. The use of safety system 830 on each forklift truck increases an ability of truck 825 operator knowing that an approaching monitored area is unsafe. Depending upon conditions, truck 825 operator may proceed with caution, wait, take a different route, or exit the vehicle to make a direct visual inspection of the approaching monitored area.

One reason that the preferred embodiment uses an RFID token consisting of a pair of associated RFID tags (one with a hardhat and one with a safety vest) is to help ensure that everyone within the areas use both. Additionally, the token help to ensure security of the area by helping to detect when an unauthorized entrance is made into a monitored area. Entering into a monitored area with a goal of theft or subversion of product quality (a concern of homeland security particularly for areas in which food or chemicals or the like is distributed) is harder using the RFID token system described. An unauthorized may not just find a random hardhat and safety vest, but they must have a pair of tags that are associated with each other. RFID subsystem 815 will still be able to provide the detecting/indicating features based upon just one RFID tag, but detection of a mismatched pair of tags generates an action procedure (such as sending a message to a security personnel to investigate).

The recording component of RFID subsystem 815 may include cameras as well. This helps to ensure that the activities in the monitored areas are appropriate and that procedures for the safety/security of the personnel and goods stored/passing through the monitored areas are followed.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other mechanism.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A security system, comprising:

an RFID subsystem including one or more RFID transceiver/detector systems detecting an entry of an RFID tag-token within a monitored area wherein said RFID subsystem is fixed to a first immobile structure within said monitored area and wherein said RFID subsystem wirelessly transmits an activating signal when detecting said entry of said RFID token within the monitored area; an RFID token associated with a person accessing said monitored area; and an indicator system, including an entry indicator coupled to a second immobile structure within said monitored area, said entry indicator having a wireless receiver responsive to said activating signal, providing an indication when said person enters into said monitored area by detecting said associated RFID token;

wherein said indicator system includes a safety system coupled to a forklift truck operable within said monitored area, said safety system including an interlock system and a wireless receiver responsive to said activating signal, coupled to said forklift truck, disabling said forklift truck from entering into said monitored area when said person is within said monitored area.

2. The system of claim 1 wherein said entry indicator includes a visual indicator that provides visual cues when said person enters into said monitored area.

3. The system of claim 2 wherein said indicator system includes a set of status lights for indicating a clear mode, a caution mode, and a warning mode.

4. The system of claim 1 wherein said indicator system includes a portable indicator system associated with a forklift truck operating within said monitored area, said portable indicator system having a wireless receiver responsive to said activating signal.

5. The system of claim 1 wherein said entry indicator includes an audible indicator that provides audible cues when said person enters into said monitored area.

6. The system of claim 1 wherein said RFID token is associated with an article of clothing worn by said person.

7. The system of claim 6 wherein said RFID token is provided in a safety vest issued to said person.

8. The system of claim 6 wherein said RFID token is provided in a hardhat issued to said person.

9. The system of claim 1 wherein said RFID token includes a first RFID tag associated with a first article of clothing and a second RFID tag associated with a second article of clothing, said RFID tags having a specified association.

10. The system of claim 9 wherein said RFID subsystem monitors for said first and second RFID tags and said specified association, said RFID subsystem providing an alert when said specified association does not exist.

11. The system of claim 10 wherein a first one of said associated RFID tags is associated with a hardhat and wherein a second one of said associated RFID tags is associated with a safety vest.

12. The system of claim 1 wherein a vehicle operates within said monitored area and wherein an operator of said vehicle is associated with a second RFID token and wherein said RFID subsystem tracks said second RFID token within said monitored area.

13. The system of claim 1 further comprising a recording system coupled to said RFID subsystem storing a history of times of entry and exit of said person with respect to said monitored area.

14. A system, comprising:

an RFID subsystem including one or more RFID transceiver/detector systems detecting an entry of one or more RFID tokens within one or more monitored areas wherein said RFID subsystem is fixed to a first immobile structure within said one or more monitored areas and wherein said RFID subsystem wirelessly transmits an activating signal when detecting said entry of said RFID token within the monitored area;

an RFID token associated with each person accessing any of said monitored areas; and an indicator system, including an entry indicator coupled to a second immobile structure within said monitored area, said entry indicator having a wireless receiver responsive to said activating signal, providing an indication when any person enters into one of said monitored areas responsive to a detection of any associated RFID token;

wherein said indicator system includes a safety system coupled to a forklift truck operable within said monitored area, said safety system including an interlock system and a wireless receiver responsive to said activating signal, coupled to said forklift truck, disabling said forklift truck from entering into said monitored area when said person is within said monitored area.

15. A method, the method comprising:

(a) detecting an entry of one or more RFID tokens within one or more monitored areas using an RFID subsystem by use of an RFID subsystem fixed to a first immobile structure within said one or more monitored areas;

(b) transmitting wirelessly an activating signal from said RFID subsystem when detecting said entry of said RFID token within the monitored area; and (c) indicating, using an entry indicator coupled to a second immobile structure within said monitored area, to a driver of a vehicle entering into said one or more monitored areas responsive to said activating signal wirelessly received from said RFID subsystem, when one or more RFID tokens have been detected within said one or more monitored areas;

wherein said vehicle includes a safety system with a wireless receiver and wherein said indicating process includes disabling said vehicle, responsive to said activating signal, from entering said one or more monitored areas.

16. The method of claim 15 wherein said RFID token includes a pair of associated RFID tags.

17. The system of claim 1 further comprising a location system that locates a specific RFID token within said monitored area.

18. The system of claim 1 wherein said monitored area includes a first region and wherein said indicator system includes a first indicator fixed and immobile and associated with said first region, wherein said indication includes a response by said first indicator; and wherein said response by said first indicator is responsive to a status of said person within said first region.

19. The system of claim 18 wherein said monitored area further includes a second region and wherein said indicator system includes a second indicator fixed and immobile and associated with said second region, wherein said indication includes a response by said second indicator; and wherein said response by said second indicator is responsive to a status of said person within said second region.

* * * * *